United States Patent
Ma

(10) Patent No.: US 10,012,795 B2
(45) Date of Patent: Jul. 3, 2018

(54) MULTI-MODE INTERFERENCE COUPLER

(71) Applicant: Elenion Technologies, LLC, New York, NY (US)

(72) Inventor: Yangjin Ma, New York, NY (US)

(73) Assignee: Elenion Technologies, LLC, New York, NY (US)

( * ) Notice: Subject to any disclaimer, the term of this patent is extended or adjusted under 35 U.S.C. 154(b) by 0 days.

(21) Appl. No.: 15/708,578

(22) Filed: Sep. 19, 2017

(65) Prior Publication Data
US 2018/0003897 A1    Jan. 4, 2018

Related U.S. Application Data

(63) Continuation of application No. 15/379,695, filed on Dec. 15, 2016, now Pat. No. 9,798,086, which is a continuation of application No. 14/754,306, filed on Jun. 29, 2015, now Pat. No. 9,557,486.

(51) Int. Cl.
| | | |
|---|---|---|
| *G02B 6/28* | (2006.01) | |
| *G02B 6/125* | (2006.01) | |
| *G02B 6/122* | (2006.01) | |
| *G02B 6/12* | (2006.01) | |

(52) U.S. Cl.
CPC ........... *G02B 6/2813* (2013.01); *G02B 6/125* (2013.01); *G02B 6/1228* (2013.01); *G02B 2006/1215* (2013.01); *G02B 2006/12147* (2013.01); *G02B 2006/12159* (2013.01)

(58) Field of Classification Search
CPC .... G02B 6/2813; G02B 6/1228; G02B 6/125; G02B 2006/12147; G02B 2006/1215; G02B 2006/12159

USPC ........................................................ 385/24
See application file for complete search history.

(56) References Cited

U.S. PATENT DOCUMENTS

| | | | |
|---|---|---|---|
| 6,236,784 B1 | 5/2001 | Ido | |
| 7,088,889 B2 | 8/2006 | Takahashi | |
| 7,200,308 B2 | 4/2007 | Hochberg | |
| 7,339,724 B2 | 3/2008 | Hochberg | |
| 7,424,192 B2 | 9/2008 | Hochberg | |
| 7,480,434 B2 | 1/2009 | Hochberg | |
| 7,643,714 B2 | 1/2010 | Hochberg | |
| 7,760,970 B2 | 7/2010 | Baehr-Jones | |
| 7,840,108 B2 | 11/2010 | Miyadera | |
| 7,894,696 B2 | 2/2011 | Baehr-Jones | |
| 8,031,985 B2 | 10/2011 | Hochberg | |
| 8,067,724 B2 | 11/2011 | Hochberg | |
| 8,098,965 B1 | 1/2012 | Baehr-Jones | |
| 8,203,115 B2 | 6/2012 | Hochberg | |

(Continued)

OTHER PUBLICATIONS

Soldano et al., "Optical Multi-Mode Interference Devices Based on Self-Imaging: Principles and Applications", Journal of Lightwave Technology, vol. 13. No. 4, Apr. 1995 (13 pages).

(Continued)

*Primary Examiner* — Jerry Blevins
(74) *Attorney, Agent, or Firm* — Nixon Peabody LLP

(57) ABSTRACT

An optimized SOI 2×2 multimode interference (MMI) coupler is designed by use of the particle swarm optimization (PSO) algorithm. Finite Difference Time Domain (FDTD) simulation shows that, within a footprint of 9.4×1.6 $\mu m^2$, <0.1 dB power unbalance and <1 degree phase error are achieved across the entire C-band. The excess loss of the device is <0.2 dB.

18 Claims, 8 Drawing Sheets

(56) References Cited

U.S. PATENT DOCUMENTS

| | | | |
|---|---|---|---|
| 8,237,102 | B1 | 8/2012 | Baehr-Jones |
| 8,258,476 | B1 | 9/2012 | Baehr-Jones |
| 8,270,778 | B2 | 9/2012 | Hochberg |
| 8,280,211 | B1 | 10/2012 | Baehr-Jones |
| 8,311,374 | B2 | 11/2012 | Hochberg |
| 8,340,486 | B1 | 12/2012 | Hochberg |
| 8,380,016 | B1 | 2/2013 | Hochberg |
| 8,390,922 | B1 | 3/2013 | Baehr-Jones |
| 8,798,406 | B1 | 8/2014 | Hochberg |
| 8,818,141 | B1 | 8/2014 | Hochberg |
| 9,047,569 | B2 | 6/2015 | Todd |
| 2006/0039646 | A1 | 2/2006 | Nashimoto |
| 2011/0129236 | A1* | 6/2011 | Jeong .............. G02B 6/2813 398/212 |
| 2011/0134513 | A1 | 6/2011 | Kim |
| 2011/0229072 | A1 | 9/2011 | Jeong |
| 2012/0127563 | A1* | 5/2012 | Farmer .............. G02B 6/14 359/341.3 |
| 2014/0178005 | A1* | 6/2014 | Zhang .............. G02B 6/2808 385/45 |

OTHER PUBLICATIONS

Blahut et al., "Multimode Interference Structures—New Way of Passive Elements Technology for Photonics", Opto-Electron, Rev. 9, No. 3, 2001 (8 pages).

Singh et al., "Multimode Interference (MMI) Coupler Based All Optical Switch: Design, Applications & Performance Analysis", International Journal of Recent Trends in Engineering, vol. 1, No. 3, May 2009 (5 pages).

Leuthold et al., Multimode Interference Couplers with Tunable Power Splitting Ratios, Journal of Lightwave Technology, vol. 19, No. 5, May 2001 (8 pages).

Deng et al., "Arbitrary-Ratio 1×2 Power Splitter Based on Asymmetric Mulitmode Interference", Optics Letters, vol. 39, No. 19, Oct. 1, 2014 (4 pages).

International Search Report, PCT/US2016/040214, dated Sep. 9, 2016 (4 pages).

Written Opinion of the International Searching Authority, PCT/US2016/040214, dated Sep. 9, 2016 (6 pages).

* cited by examiner

FIG. 7
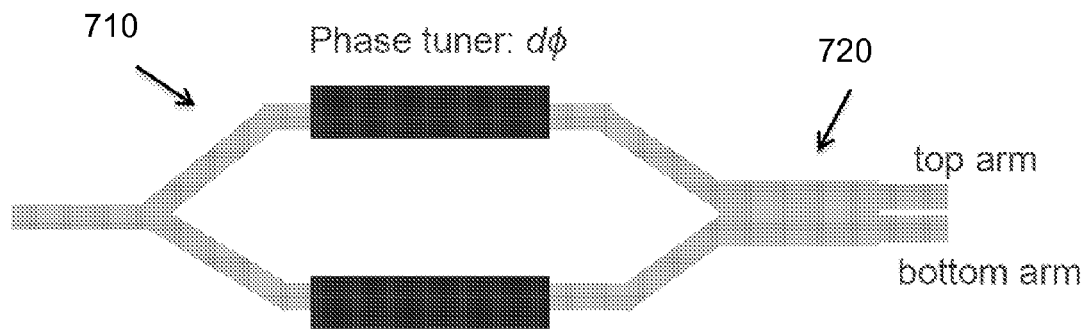
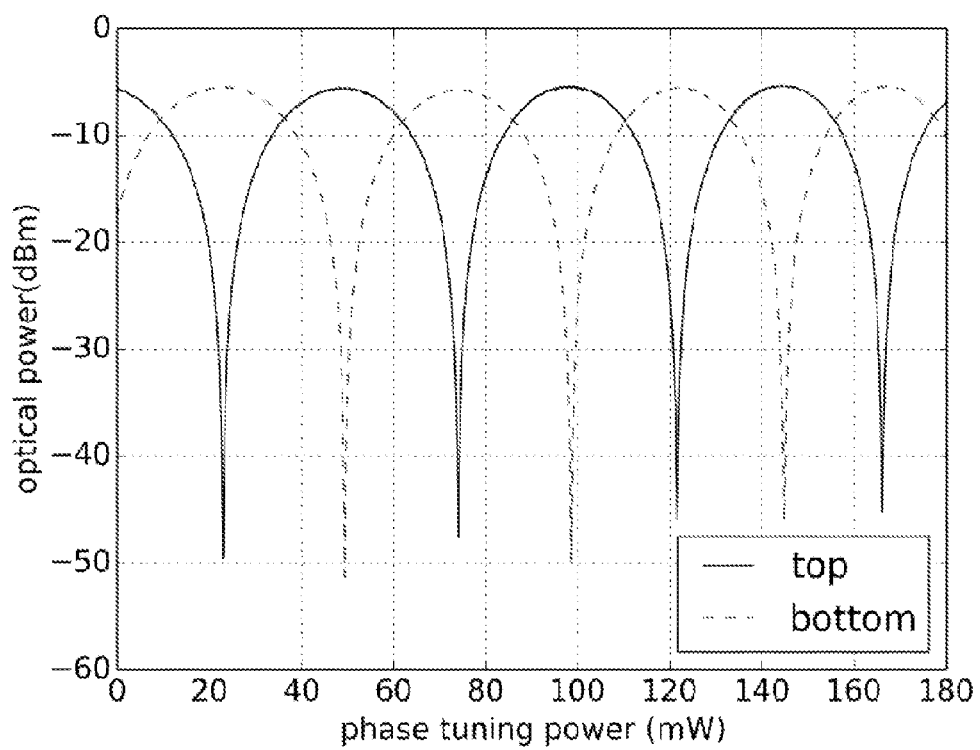
FIG. 8

MULTI-MODE INTERFERENCE COUPLER

CROSS-REFERENCE TO RELATED APPLICATIONS

This application is a continuation of U.S. patent application Ser. No. 15/379,695, filed Dec. 15, 2016, now allowed, which is a continuation of U.S. patent application Ser. No. 14/754,306, filed Jun. 29, 2015, now U.S. Pat. No. 9,557,486, each of which is hereby incorporated by reference herein in its entirety.

FIELD OF THE INVENTION

The invention relates to optical couplers in general and particularly to a multimode interference coupler.

BACKGROUND OF THE INVENTION

A 2×2 3 dB multimode interference (MMI) coupler is a fundamental building block in photonic integrated circuits (PIC). It behaves as a 3 dB power splitter such as a y-junction. It also provides 90-degree phase difference between the two output ports, which is an attractive feature in many applications such as switches and coherent communications. The broadband wavelength response also makes it a better candidate for directional couplers (DC) when it comes to 3 dB power coupling. The main challenge to replace a 3 dB directional coupler is matching or improving on the insertion loss and phase error. A small footprint is also very desirable for large-scale photonic integration.

There is a need for improved multimode interference couplers.

SUMMARY OF THE INVENTION

According to one aspect, the invention features a 2×2 multi-mode interference coupler, comprising: a multi-mode interference region having a length $L_{MMI}$ and having a plurality of segments having widths $W_1, \ldots, W_N, \ldots, W_1$, where N in an integer greater than one, with at least two of the widths $W_1, \ldots, W_N$ being different one from the other, the widths varying in a symmetric pattern relative to the central distance $L_{MMI}/2$ along the length; and four ports p1, p2, p3 and p4, two of the ports in optical communication with the multi-mode interference region at a first end thereof and spaced apart by a distance $D_{gap}$ and the other two of the ports in optical communication with the multi-mode interference region at a second end thereof, at least one of the four ports configured as an input port and two others of the four ports configured as output ports.

In one embodiment, the each of the two of the ports in optical communication with the multi-mode interference region at first end thereof is connected to the multi-mode interference region by a taper connector having a length $L_{taper}$.

In another embodiment, the length $L_{taper}$ is tuned to reduce optical loss.

In yet another embodiment, the 2×2 multi-mode interference coupler is configured to be operable in a wavelength in a band selected from an O band, an E band, an S band, a C band, an L band, and a U band.

In a further embodiment, a plurality of the 2×2 multi-mode interference couplers are cascaded with one of the two of the four ports configured as output ports of a first of the plurality of the 2×2 multi-mode interference couplers is connected in serial connection with one of the at least one of the four ports configured as an input port of a second of the plurality of the 2×2 multi-mode interference couplers.

According to a further aspect, the invention provides an N×M multi-mode interference coupler, comprising: a multi-mode interference region having a length $L_{MMI}$ and having a plurality of segments having widths $W_1, \ldots, W_N, \ldots, W_1$, where N in an integer greater than one, with at least two of the widths $W_1, \ldots, W_N$ being different one from the other, the widths varying in a symmetric pattern relative to the central distance $L_{MMI}/2$ along the length; and N×M ports, N of the ports in optical communication with the multi-mode interference region at a first end thereof and spaced apart by a distance Dgap and the other M of the ports in optical communication with the multi-mode interference region at a second end thereof, at least one of the N×M ports configured as an input port and two or more of the N×M ports configured as output ports, where N and M are positive integers each greater than zero.

According to another aspect, the invention relates to a method of making a 2×2 multi-mode interference coupler. The method comprises the steps of: providing a multi-mode interference region having a length $L_{MMI}$ and having a plurality of segments having widths $W_1, \ldots, W_N, \ldots, W_1$, where N in an integer greater than one, with at least two of the widths $W_1, \ldots, W_N$ being different one from the other, the widths varying in a symmetric pattern relative to the central distance $L_{MMI}/2$ along the length; and providing four ports p1, p2, p3 and p4, two of the ports in optical communication with the multi-mode interference region at a first end thereof and spaced apart by a distance $D_{gap}$ and the other two of the ports in optical communication with the multi-mode interference region at a second end thereof, at least one of the four ports configured as an input port and two others of the four ports configured as output ports; the widths $W_1, \ldots, W_N$ calculated by application of the particle swarm optimization algorithm.

In one embodiment, the method further comprises the step of providing a taper connector having a length $L_{taper}$ to connect each of the two of the ports to the first end of the multi-mode interference region.

In another embodiment, the 2×2 multi-mode interference coupler is configured to be operable in a wavelength selected from the wavelengths a band selected from an O band, an E band, an S band, a C band, an L band, and a U band.

According to another aspect, the invention relates to a method of using a 2×2 multi-mode interference coupler. The method comprises the steps of: providing a multi-mode interference region having a length $L_{MMI}$ and having a plurality of segments having widths $W_1, \ldots, W_N, \ldots, W_1$, where N in an integer greater than one, with at least two of the widths $W_1, \ldots, W_N$ being different one from the other, the widths varying in a symmetric pattern relative to the central distance $L_{MMI}/2$ along the length; and providing four ports p1, p2, p3 and p4, two of the ports in optical communication with the multi-mode interference region at a first end thereof and spaced apart by a distance $D_{gap}$ and the other two of the ports in optical communication with the multi-mode interference region at a second end thereof, at least one of the four ports configured as an input port and two others of the four ports configured as output ports; the widths $W_1, \ldots, W_N$ calculated by application of the particle swarm optimization algorithm; applying an input optical signal to one of the four ports configured as an input port; and recovering two optical output signals, one each at each of the two others of the four ports configured as output ports, at least one of the two optical output signals differing from the input optical signal at least one of a mode and a phase.

In one embodiment, the 2×2 multi-mode interference coupler is configured to be operable in a wavelength in a band selected from an O band, an E band, an S band, a C band, an L band, and a U band.

The foregoing and other objects, aspects, features, and advantages of the invention will become more apparent from the following description and from the claims.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

FIG. 7 is a schematic diagram of a test structure comprising a Mach Zehnder interferometer used as a phase tuner to drive a MMI coupler.

FIG. 8 is a graph of the optical power in each of a top arm and a bottom arm as a function of phase tuning power.

DETAILED DESCRIPTION

Acronyms

A list of acronyms and their usual meanings in the present document (unless otherwise explicitly stated to denote a different thing) are presented below.

AMR Adabatic Micro-Ring
APD Avalanche Photodetector
ARM Anti-Reflection Microstructure
ASE Amplified Spontaneous Emission
BER Bit Error Rate
BOX Buried Oxide
CMOS Complementary Metal-Oxide-Semiconductor
CMP Chemical-Mechanical Planarization
DBR Distributed Bragg Reflector
DC (optics) Directional Coupler
DC (electronics) Direct Current
DCA Digital Communication Analyzer
DRC Design Rule Checking
DSP Digital Signal Processor
DUT Device Under Test
ECL External Cavity Laser
E/O Electro-optical
FDTD Finite Difference Time Domain
FFE Feed-Forward Equalization
FOM Figure of Merit
FSR Free Spectral Range
FWHM Full Width at Half Maximum
GaAs Gallium Arsenide
InP Indium Phosphide
$LiNO_3$ Lithium Niobate
LIV Light intensity (L)-Current (I)-Voltage (V)
MFD Mode Field Diameter
MMI Multi Mode Interference
MPW Multi Project Wafer
NRZ Non-Return to Zero
OOK On-Off Keying
PIC Photonic Integrated Circuits
PRBS Pseudo Random Bit Sequence
PDFA Praseodymium-Doped-Fiber-Amplifier
PSO Particle Swarm Optimization
Q Quality factor $$Q = 2\pi \times \frac{\text{Energy Stored}}{\text{Energy dissipated per cycle}} = 2\pi f_r \times \frac{\text{Energy Stored}}{\text{Power Loss}}.$$

QD Quantum Dot
RSOA Reflective Semiconductor Optical Amplifier
SOI Silicon on Insulator
SEM Scanning Electron Microscope
SMSR Single-Mode Suppression Ratio
TEC Thermal Electric Cooler
WDM Wavelength Division Multiplexing An optimized Silicon-On-Insulator 2×2 MMI (multimode interference) coupler useful in manipulating optical signals is designed by particle swarm optimization (PSO) algorithm. FDTD simulation shows that, within a footprint of 9.4×1.6 $\mu m^2$, <0.1 dB power unbalance and <1 degree phase error are achieved across the entire C-band. The excess loss of the device is <0.2 dB.

Figure 1:
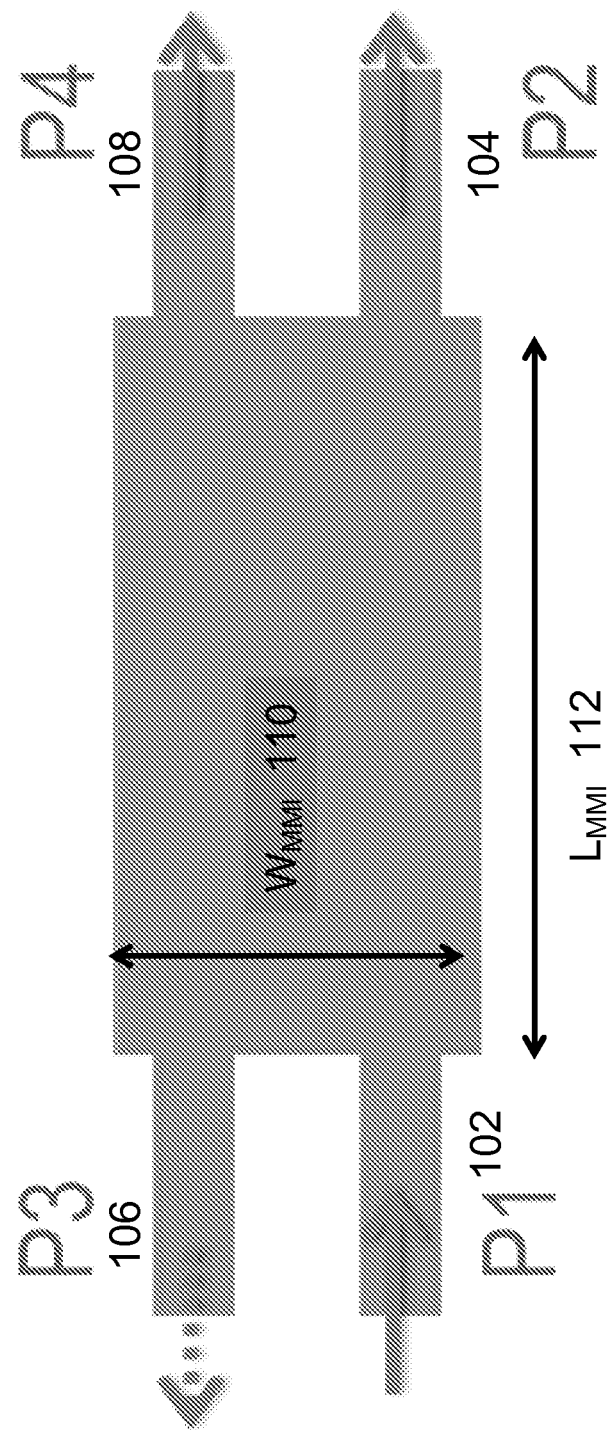
FIG. 1 is a schematic diagram of a prior art MMI coupler.

FIG. 1 is a schematic diagram of a prior art MMI coupler. The operating principle is defined by self-imaging theory. The prior art MMI coupler has four ports, P1 102, P2 104, P3 106 and P4 108. A waveguide mode optical signal is launched at one of these four ports (P1 in the case of FIG. 1), propagates in a rectangular piece of multimode region, and then two imaging mode optical signals with 90-degree phase difference emerge at the output ports (P2 and P4 in FIG. 1). The vertical port locations are fixed at ±¼ $W_{MMI}$ as required by self-imaging theory. In the conventional prior art practice, one tunes the width ($W_{MMI}$ 110) and length ($L_{MMI}$ 112) when designing a 3 dB MMI coupler.

As can be seen, there is not much design freedom for a typical rectangular shaped 2×2 MMI. A self-imaging point can be readily found by tuning $W_{MMI}$ and $L_{MMI}$. However, to couple light out of the multimode region to a waveguide introduces excess loss. In addition, the geometry and symmetry property of the MMI will be altered during fabrication as a result of variations in processing such as may be caused by variations from run to run or even from wafer to wafer in lithography, etching, wafer thickness variation, and the like, affecting the power balance and the phase error. Simply changing the dimensions $W_{MMI}$ and $L_{MMI}$ of the device does not produce useful results.

We describe an MMI that is designed using an optimization algorithm. Some features of this device are now enumerated. The geometry of the multimode region is no longer a rectangle but is optimized by application of the particle swarm optimization (PSO) algorithm. Short tapers are introduced between the multimode region and input/output waveguides to better guiding the optical mode. A few-mode region is chosen to enhance the optical field coupling and shrink device footprint, which is different from the typical prior art MMI coupler in which the multimode region supports a large number of optical modes.

Figure 2:
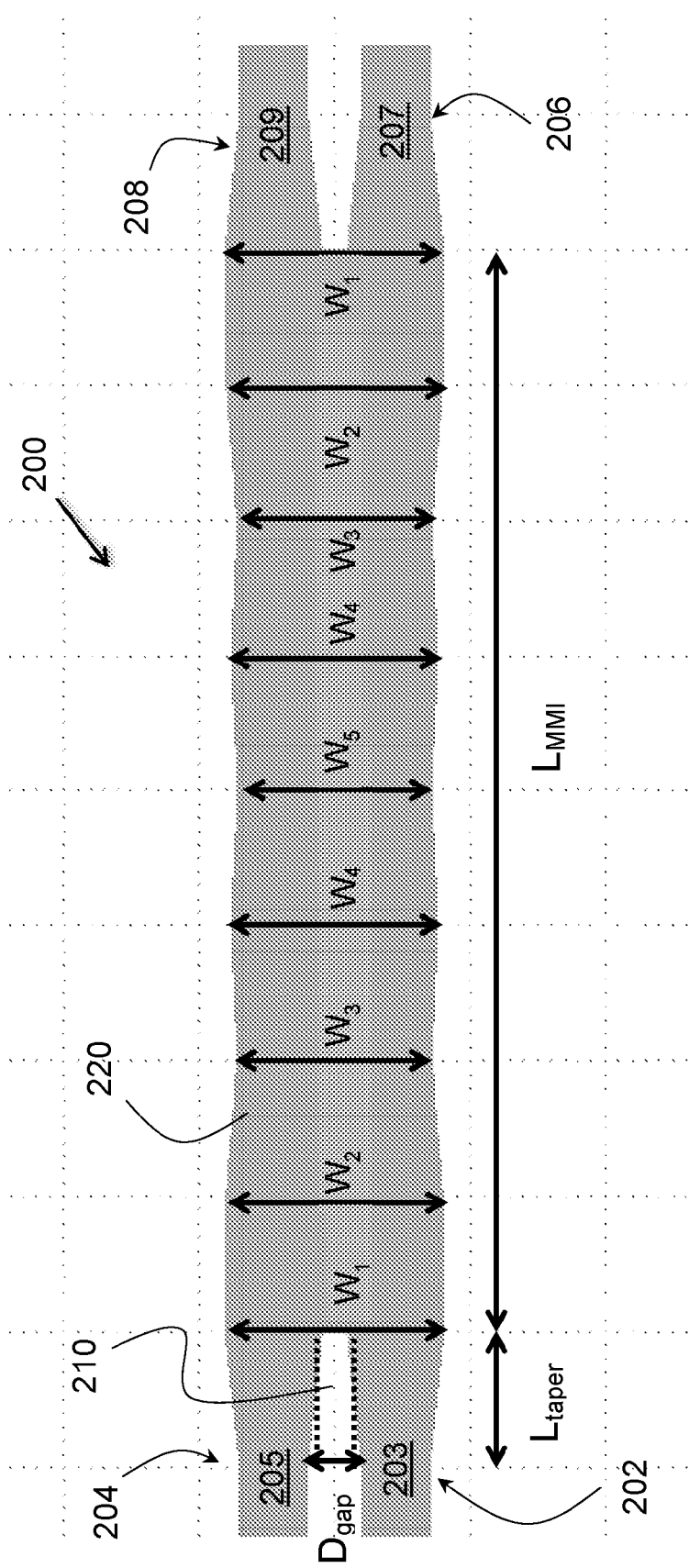
FIG. 2 is a schematic of one embodiment of an improved MMI coupler constructed and operated according to principles of the invention.

FIG. 2 is a schematic of one embodiment of an improved MMI coupler constructed and operated according to principles of the invention.

In FIG. 2, the width of the MMI coupler is digitized into several segments (8 segments in the embodiment illustrated in FIG. 2), identified by a width parameter Wi, where i is a positive integer. In FIG. 2 the widths are given as {W1, W2, W3, W4, W5, W4, W3, W2, W1}. In the embodiment illustrated in FIG. 2, the widths are taken at equally spaced locations along the length $L_{MMI}$. In other embodiments, the widths can be determined at locations that are not equally spaced along the length $L_{MMI}$. By defining the width parameter group, the geometric symmetry of the MMI coupler is maintained. Because of the geometric symmetry, the MMI coupler will work the same way in either direction. The input/output guiding tapers connect to the very edge of the multimode region to smoothly transform the input/output mode profiles. A gap 210 having a dimension Dgap is predefined between the top and the bottom waveguides, so that they are spaced apart by that distance. During optimization, $L_{MMI}$ is fixed. After the optimized MMI geometry has been obtained, one can tune or modify the length $L_{taper}$ to further reduce optical loss.

A design figure of merit (FOM) was set to be the total output power minus the unbalance of (or absolute difference between) the power of two output branches, as given by the following equation, in which the power is measured at ports p3 and p4, as shown in FIG. 2:

$$FOM=Power(p3)+Power(p4)-abs(Power(p3)-Power(p4)).$$

The SOI thickness during simulation is set at 220 nm. By choosing the parameters Dgap=0.2 μm, W_taper_wide=0.7 μm, W_taper_narrow=0.5 μm and $L_{MMI}$=8 μm, PSO converges with a FOM=0.985. The width parameters for the embodiment shown in FIG. 2 are presented in Table 1.

TABLE 1

|  | $W_1$ | $W_2$ | $W_3$ | $W_4$ | $W_5$ |
|---|---|---|---|---|---|
| Width (μm) | 1.6 | 1.587 | 1.45 | 1.5 | 1.439 |
| Distance from edge of MMI (μm) | 0 | 1 | 2 | 3 | 4 |

Figure 3:
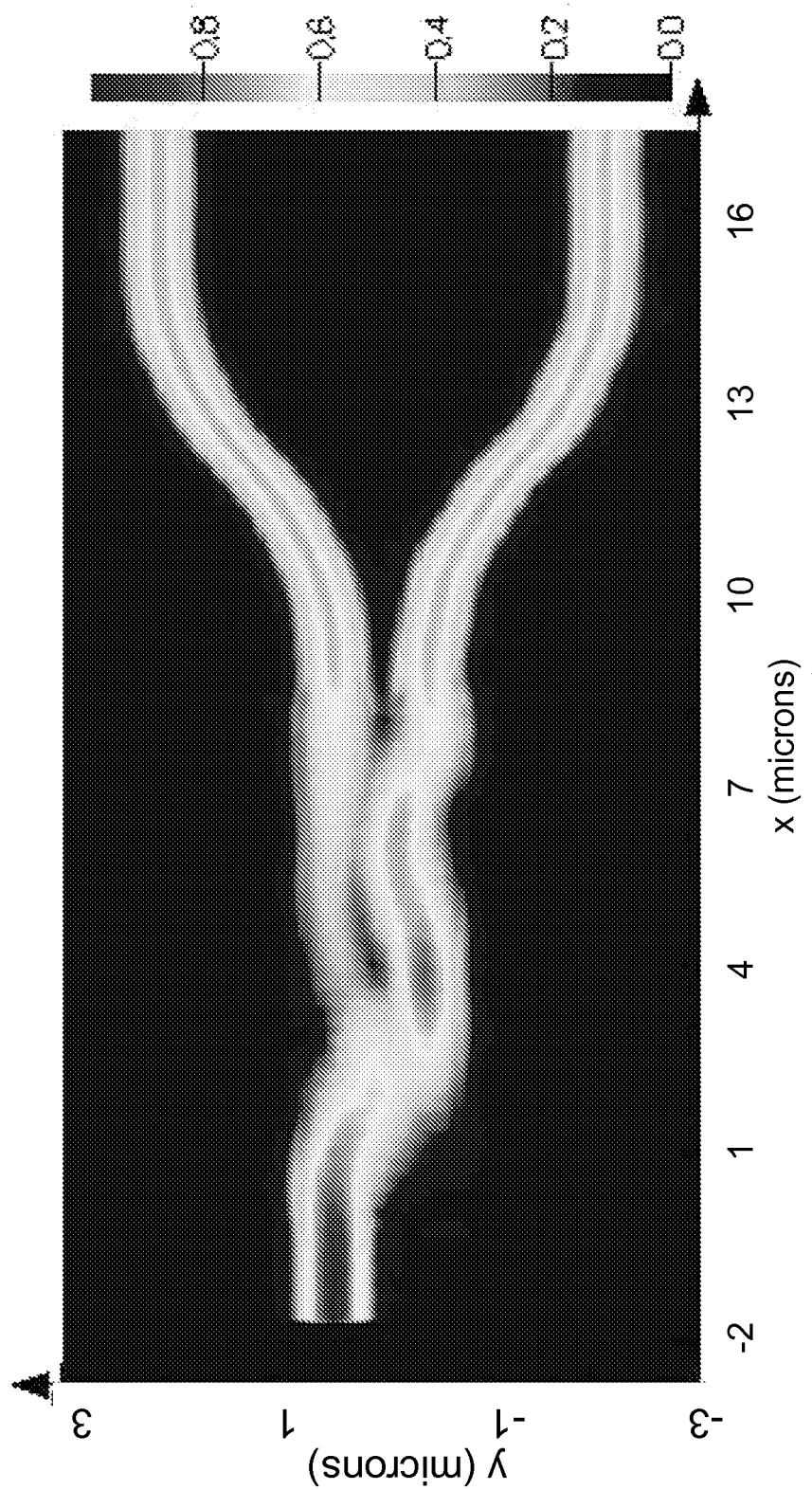
FIG. 3 is a graph of the finite difference time domain simulated electrical field propagation in a device of FIG. 2.

FIG. 3 is a graph of the finite difference time domain simulated electrical field propagation in a device of FIG. 2. As is clearly seen, the amplitude of the E-field is evenly distributed at the right side with minimal scattering loss.

Figure 4:
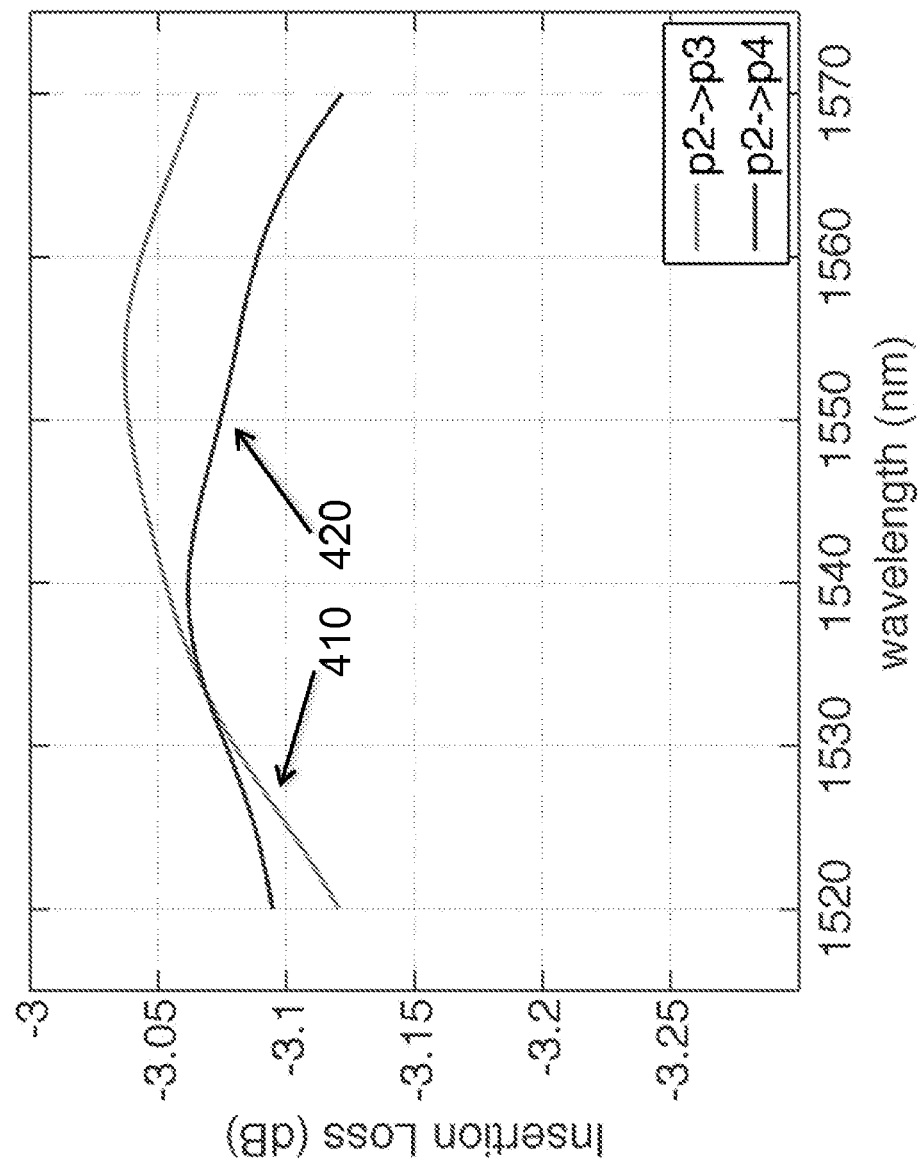
FIG. 4 is a graph showing an insertion loss simulation for a device of FIG. 2.

FIG. 4 is a graph showing an insertion loss simulation for a device of FIG. 2. The detailed wavelength dependent performance of each output branch is shown in FIG. 4. Curve 410 is the curve for signal input at port p2 and signal output at port p3, while curve 420 is that for signal input at port p2 and signal output at port p4. Similar behavior would be expected for signal input at port p1 in place of port p2. Overall, the average excess loss in either branch is about 0.07 dB with a worst case of 0.13 dB and best case of 0.04 dB. These two branches are very well balanced, with <0.1 dB difference. The device also provides ultra broadband performance, with <0.1 dB variation across the C-band.

Figure 5:
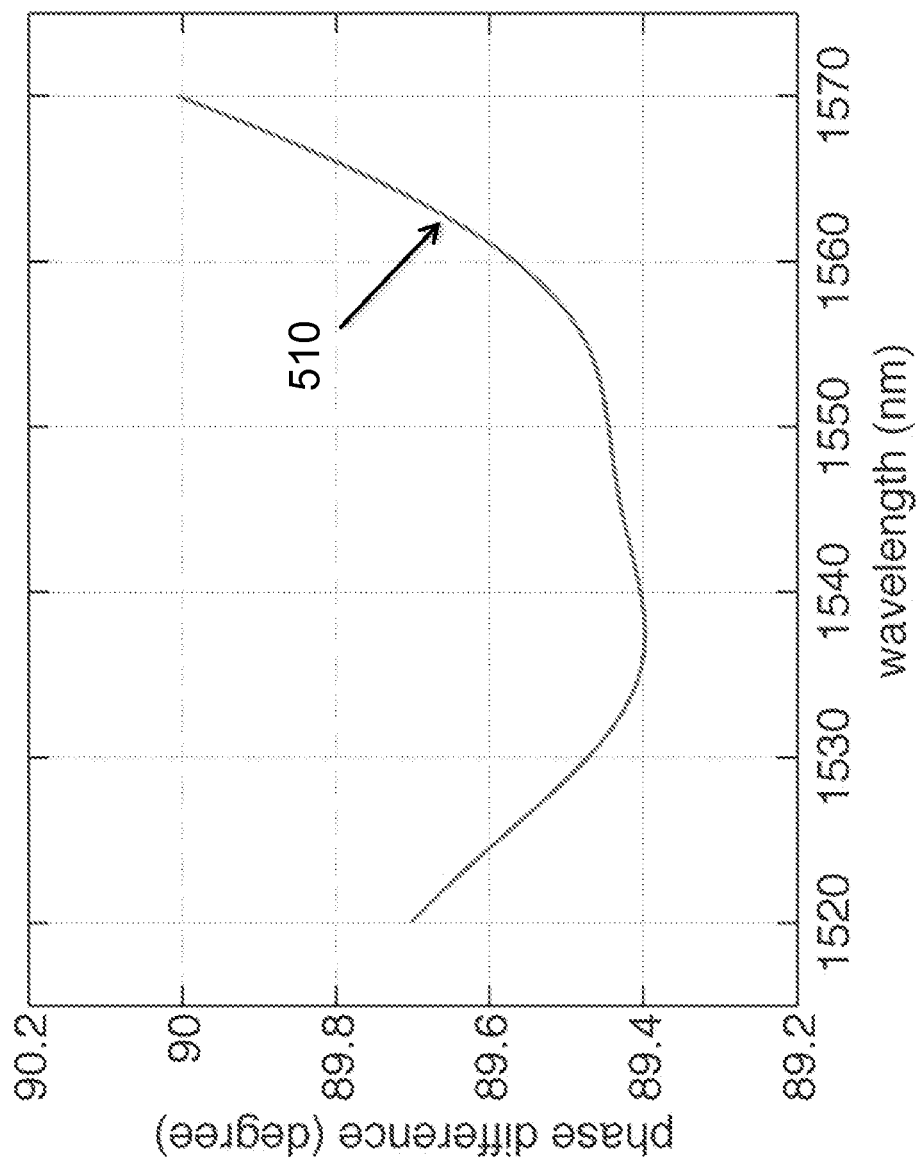
FIG. 5 is a graph showing a phase error simulation for a device of FIG. 2.

FIG. 5 is a graph showing a phase error simulation for a device of FIG. 2. As shown in FIG. 5, the phase difference is almost perfectly matched to 90-degree, within an error of 0.6 degree across C-band. The 2×2 MMI described is expected to provide high performance in loss and power balance, with a phase error that is very small.

Experimental Results

Insertion loss can be measured by cascading the devices. By cascading the devices with different numbers, one can accurately extract the insertion loss of the device. One application of such cascaded structures is to provide a test structure in the spare space of a large system to enable device characterizations in wafer scale fabrication.

Figure 6:
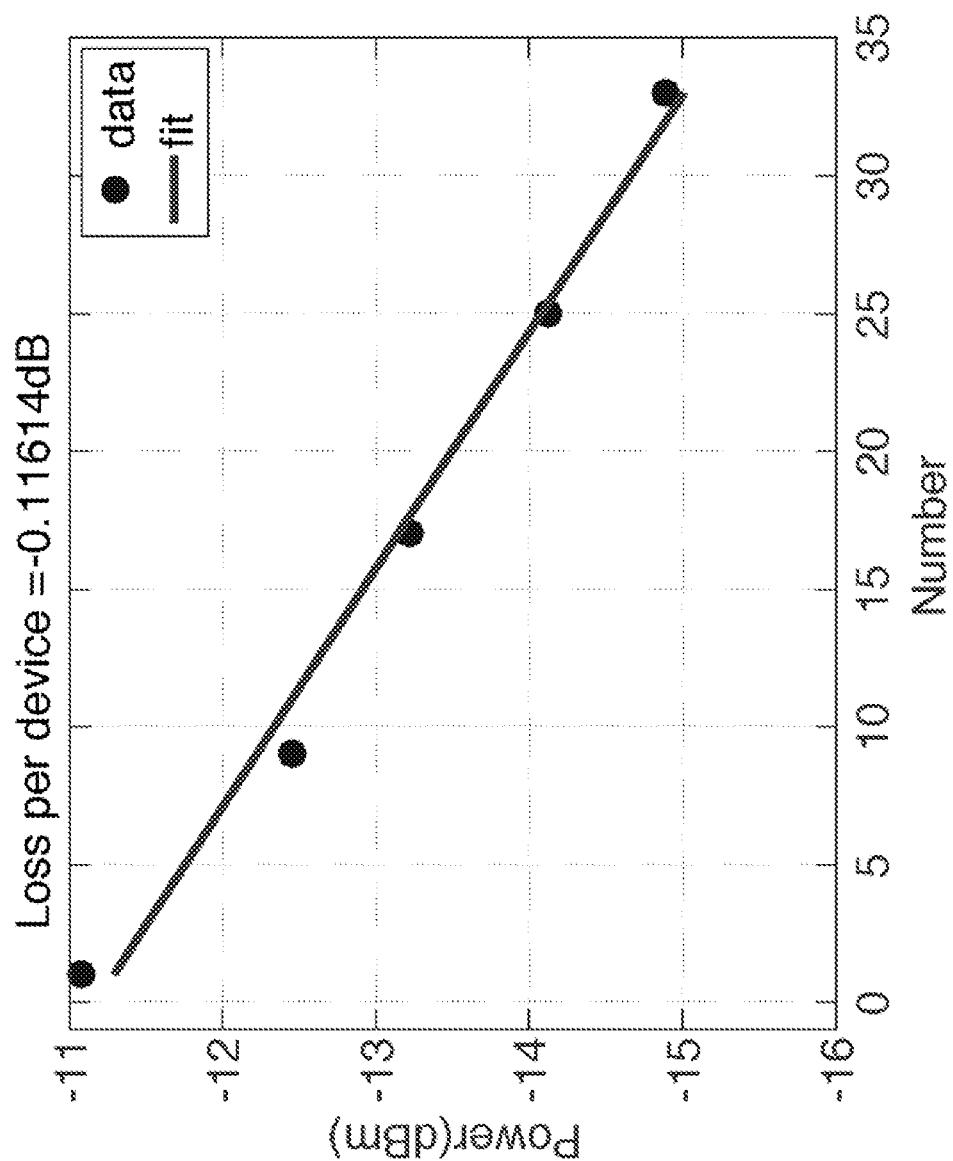
FIG. 6 is a graph showing the experimental data for the loss vs. the number of cascaded devices, and a curve fit to the data.

FIG. 6 is a graph showing the experimental data for the loss in delivered power vs. the number of cascaded devices, and a curve fit to the data. The measured loss per device is about 0.11 dB at a wavelength around 1550 nm.

FIG. 7 is a schematic diagram of a test structure comprising a Mach Zehnder interferometer 710 used as a phase tuner to drive a MMI coupler 720. Imbalance and phase error can be measured by the MZI structure shown in FIG. 7. The imbalance can be measured by the extinction ratio of the MZI spectrum.

FIG. 8 is a graph of the optical power in each of a top arm and a bottom arm as a function of phase tuning power. As shown in FIG. 8, the extinction ratio is about 45 dB for both output arms, indicating imbalance of about 0.1 dB. By comparing the phases of bottom arm and top arm, the phase error is measured to be within 1 degree.

It is believed that apparatus constructed using principles of the invention and methods that operate according to principles of the invention can be used in the wavelength ranges (O band, E band, S band, C band, L band, and U band) described in Table II.

TABLE II

| Band | Description | Wavelength Range |
|---|---|---|
| O band | original | 1260 to 1360 nm |
| E band | extended | 1360 to 1460 nm |
| S band | short wavelengths | 1460 to 1530 nm |
| C band | conventional ("erbium window") | 1530 to 1565 nm |
| L band | long wavelengths | 1565 to 1625 nm |
| U band | ultralong wavelengths | 1625 to 1675 nm |

Figure 9:
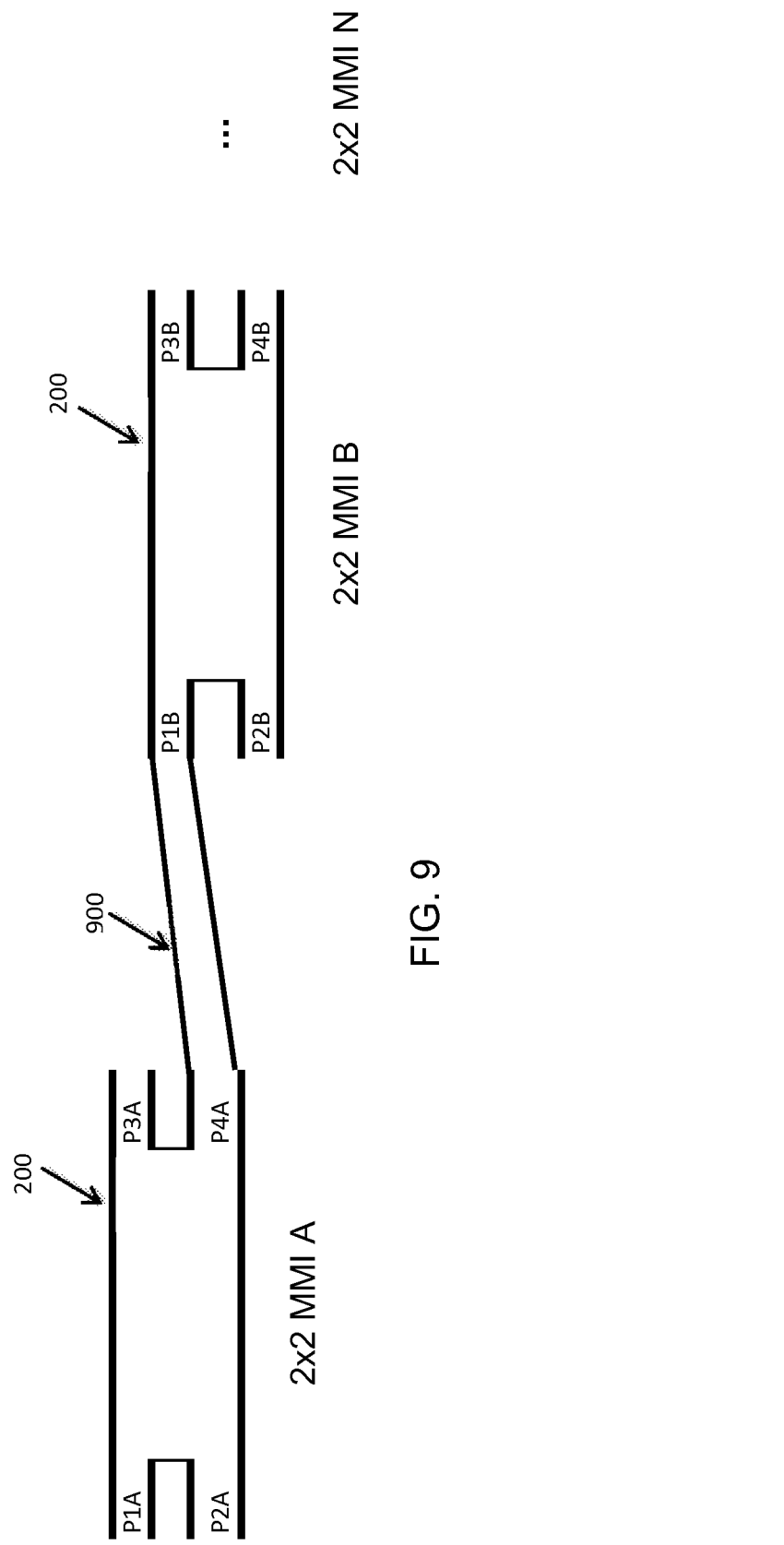
FIG. 9 is a schematic diagram in which a first 2×2 multi-mode interference coupler is cascaded with a second 2×2 multi-mode interference coupler 200.

FIG. 9 is a schematic diagram in which a first 2×2 multi-mode interference coupler 200 (2×2 MMI A) is cascaded with a second 2×2 multi-mode interference coupler 200 (2×2 MMI A). As shown in FIG. 9 output port P4A of 2×2 MMI A is in optical communication with input port P1B of 2×2 MMI B by way of optical carrier 900, which in various embodiments can be an optical waveguide, or the two 2×2 multi-mode interference couplers can be close enough that one output is directly in optical communication with an input of a subsequent coupler. Note that port P4A can also be directly connected to port P2B (meanwhile P3A is connected to P1B) to form cascaded MMI structure. As illustrated in FIG. 9, any convenient number of couplers can be cascaded, if A=1, B=2, and N is a positive integer equal to or greater than 3.

It is believed that other coupler, such as to other M×M or N×M MMI coupler designs such as 3×3 MMI, 4×4 MMI, 2×4 MMI, and so forth can also be designed and constructed by direct extension of the methods to design and to fabricate the 2×2 MMI embodiment that has been described herein.

Design and Fabrication

Methods of designing and fabricating devices having elements similar to those described herein are described in one or more of U.S. Pat. Nos. 7,200,308, 7,339,724, 7,424, 192, 7,480,434, 7,643,714, 7,760,970, 7,894,696, 8,031,985, 8,067,724, 8,098,965, 8,203,115, 8,237,102, 8,258,476, 8,270,778, 8,280,211, 8,311,374, 8,340,486, 8,380,016, 8,390,922, 8,798,406, and 8,818,141, each of which documents is hereby incorporated by reference herein in its entirety.

Definitions

As used herein, the term "optical communication channel" is intended to denote a single optical channel, such as light that can carry information using a specific carrier wavelength in a wavelength division multiplexed (WDM) system.

As used herein, the term "optical carrier" is intended to denote a medium or a structure through which any number of optical signals including WDM signals can propagate, which by way of example can include gases such as air, a void such as a vacuum or extraterrestrial space, and structures such as optical fibers and optical waveguides.

Theoretical Discussion

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

Any patent, patent application, patent application publication, journal article, book, published paper, or other publicly available material identified in the specification is hereby incorporated by reference herein in its entirety. Any material, or portion thereof, that is said to be incorporated by reference herein, but which conflicts with existing definitions, statements, or other disclosure material explicitly set forth herein is only incorporated to the extent that no conflict arises between that incorporated material and the present disclosure material. In the event of a conflict, the conflict is to be resolved in favor of the present disclosure as the preferred disclosure.

While the present invention has been particularly shown and described with reference to the preferred mode as illustrated in the drawing, it will be understood by one skilled in the art that various changes in detail may be affected therein without departing from the spirit and scope of the invention as defined by the claims.

What is claimed is:

1. An optical coupler, comprising:
   a multi-mode region including: a length L between a first end and a second end; and a plurality of segments having widths, at least five of said segment widths from the first end to the second end being different one from the other;
   a plurality of first ports at the first end of the multi-mode region; and
   a plurality of second ports at the second end of the multi-mode region;
   wherein the second and fourth segment widths from the first end are greater than the third and fifth widths from the first end.

2. The coupler according to claim 1, wherein the multi-mode region comprises a few-mode region.

3. The coupler according to claim 1, wherein said segment widths vary in a symmetric pattern relative to a central distance L/2 along said length defining a bidirectional coupler.

4. The coupler according to claim 1, wherein said segment widths are at equally spaced locations along the length.

5. The coupler according to claim 2, wherein the plurality of first ports comprises two ports; and wherein the plurality of second ports comprises two ports.

6. The coupler according to claim 5, wherein said widths range from 1.439 µm to 1.6 µm.

7. The coupler according to claim 5, wherein the few-mode region and the plurality of first and second ports are within a footprint of $9.4 \times 1.6$ µm$^2$.

8. The coupler according to claim 5, wherein each of said ports is connected to said few-mode region by a taper connector.

9. The coupler according to claim 2, wherein at least one taper connector is connected to an edge of the few-mode region to smoothly transform input/output mode profiles.

10. A method of manufacturing an optical coupler, comprising:
    a multi-mode region including: a length L between a first end and a second end; and a plurality of segments having widths, at least five of said segment widths from the first end to the second end being different one from the other, wherein the second and fourth segment widths from the first end are greater than the third and fifth widths from the first end;
    a plurality of first ports at the first end of the multi-mode region; and
    a plurality of second ports at the second end of the multi-mode region;
    said method comprising:
    determining each width for the plurality of segments for a predefined set of design parameters, using a computerized optimization algorithm; and
    fabricating the optical coupler with the widths.

11. The method according to claim 10, wherein the multi-mode region comprises a few-mode region.

12. The method according to claim 10, wherein the computerized optimization algorithm comprises one of a particle swarm optimization algorithm.

13. The method according to claim 10, wherein said segment widths vary in a symmetric pattern relative to a central distance L/2 along said length defining a bidirectional coupler.

14. The method according to claim 10, wherein said segment widths are at equally spaced locations along the length.

15. The method according to claim 11, wherein the plurality of first ports comprises two ports; and wherein the plurality of second ports comprises two ports.

16. The coupler according to claim 15, wherein said widths range from 1.439 µm to 1.6 µm.

17. The method according to claim 15, wherein the few-mode region and the plurality of first and second ports are within a footprint of $9.4 \times 1.6$ µm$^2$.

18. The method according to claim 15, wherein each of said ports is connected to said few-mode region by a taper connector to smoothly transform input/output mode profiles.

* * * * *